United States Patent
Houde et al.

[11] Patent Number: 5,920,822
[45] Date of Patent: Jul. 6, 1999

[54] FORMATTING OF SHORT MESSAGE SERVICE MESSAGES IN A CELLULAR TELEPHONE NETWORK

[75] Inventors: Michel Houde, St-Laurent; Alain Boudreau, Le Gardeur, both of Canada

[73] Assignee: Telefonaktiebolaget LM Ericsson (publ), Sweden

[21] Appl. No.: 08/591,234

[22] Filed: Jan. 18, 1996

[51] Int. Cl.[6] ................................................. H04Q 7/20
[52] U.S. Cl. .................... 455/466; 455/31.3; 455/433; 370/349
[58] Field of Search ................... 455/31.2, 31.3, 455/414, 422, 424, 426, 433, 445, 461, 466, 552, 553; 370/349, 436, 437, 478, 469

[56] References Cited

U.S. PATENT DOCUMENTS

| | | | |
|---|---|---|---|
| 5,245,607 | 9/1993 | Caram . | |
| 5,353,331 | 10/1994 | Emery et al. | 455/414 |
| 5,363,369 | 11/1994 | Hemmady et al. | 370/469 |
| 5,369,686 | 11/1994 | Dutra et al. . | |
| 5,629,940 | 5/1997 | Gaskill | 370/349 |
| 5,655,003 | 8/1997 | Erving et al. | 455/435 |
| 5,655,215 | 8/1997 | Diachina et al. | 455/466 |
| 5,664,004 | 9/1997 | Durchman et al. | 370/469 |

FOREIGN PATENT DOCUMENTS

| | | |
|---|---|---|
| 0 665 659 A2 | 1/1995 | European Pat. Off. . |
| WO 94/16532 | 7/1994 | WIPO . |
| WO 96/21999 | 7/1996 | WIPO . |
| WO 96/26616 | 8/1996 | WIPO . |

OTHER PUBLICATIONS

*Advanced Data Services for Wireless Communication Networks* by Michael S.K. Sushko Kensington & Icknield, Ltd., 5775 Wayzata Boulevard, Suite 700, Minneapolis, MN 55416 Publication Date: Jul. 25, 1995.

Primary Examiner—Dwayne D. Bost
Assistant Examiner—Nay Maung
Attorney, Agent, or Firm—Jenkens & Gilchrist P.C.

[57] ABSTRACT

Air interface independent bearer data is provided in short message service delivery point-to-point (SMSDPP) invoke communications. The bearer data of the SMSDPP invoke communication includes a portion formatted for each of the different types of cellular network supported air interfaces. The particular portion of the bearer data corresponding to the air interface currently being used by that addressee mobile station is then processed to recover the included short message service message. Alternatively, the bearer data of the SMSDPP invoke communication is generically formatted, with the generic bearer data converted by the cellular network to be compatible with the specific one of the plurality of different types of air interfaces supported by the cellular telephone network based on an identification made by the cellular telephone system as to which air interface is currently being used by the addressee mobile station. Upon receipt, that addressee mobile station processes the converted beared data to recover the included short message service message.

33 Claims, 3 Drawing Sheets

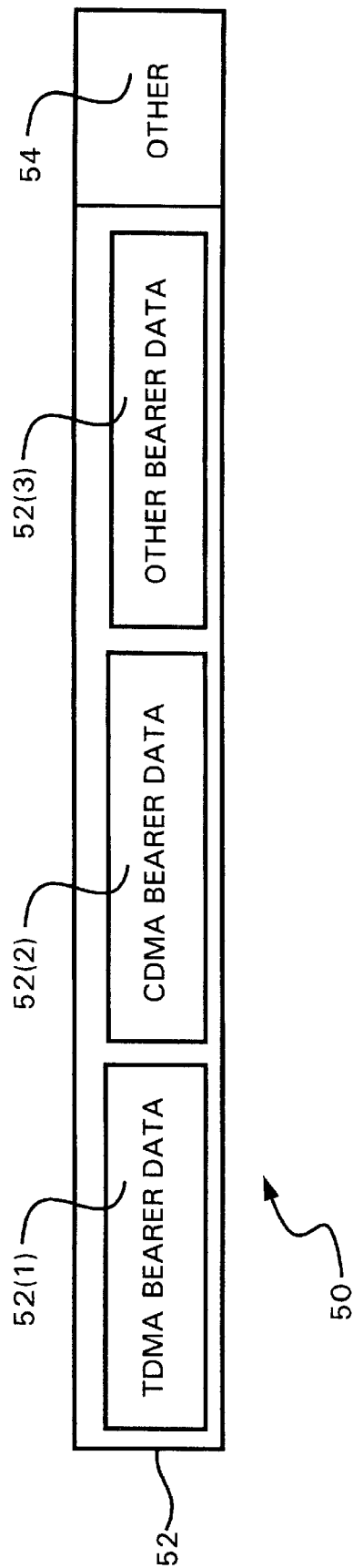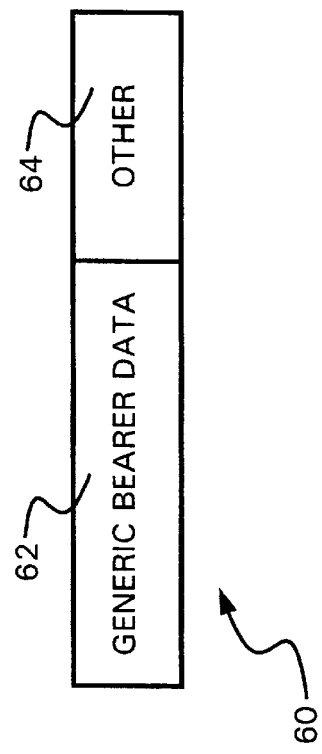

FORMATTING OF SHORT MESSAGE SERVICE MESSAGES IN A CELLULAR TELEPHONE NETWORK

BACKGROUND OF THE INVENTION

1. Technical Field of the Invention

The present invention relates to cellular telephone networks and, in particular, to cellular telephone networks supporting short message service message delivery.

2. Description of Related Art

Reference is now made to FIG. 1 wherein there is shown a block diagram of a conventional digital cellular telephone network 10. Many such networks 10 support a short message service (SMS) for use by subscribers in conjunction with the conventional cellular telephone service. The purpose of the short message service is to provide a means for transferring textual messages between short message entities (SMEs) 12 using the communications environment provided by the cellular telephone network 10.

The short message entities 12 participating in the short message service comprise short message terminals (SMT) 14 connected to the fixed telephone network 16 (comprising a public switched telephone network (PSTN) or other equivalent telephone network). The short message entities 12 further comprise the subscriber mobile stations (MS) 18 operating within the cellular telephone network 10. Short message service messages must originate with or terminate at one of the subscriber mobile stations 18.

A short message service center or message center (MC) 20 is connected to the fixed telephone network 16 and to the cellular telephone network 10. The message center 20 functions as a store and forward center for receiving and delivering short message service messages between the short message entities 12. In those instances where delivery of a short message service message to a short message service entity 12 fails, the message is stored in the message center 20, to be subsequently retrieved by the addressee short message entity at a later time.

The cellular telephone network 10 further includes a plurality of base stations 24 (only one shown) for effectuating radio frequency communications over an air interface 26 with the mobile stations 18. Each base station 24 is connected through a mobile switching center (MSC) 30 to the fixed telephone network 16. The mobile switching center 30 operates to control base station 24 operation, maintain a record (in its home location register 42 and visitor location register 44) of mobile station 18 operating parameters and location within the network 10 and switch, with the fixed telephone network 16, those cellular telephone calls originated by or terminated at the mobile stations 18. The mobile switching center 30 is further connected to the message center 20 used in providing short message services.

Delivery of a short message service message received from a short message service entity 12 to another short message service entity originates at the message center 20 wherein a short message service delivery point-to-point (SMSDPP) invoke communication is generated. The format 32 for the SMSDPP invoke communication is illustrated in FIG. 2, and includes a teleservice identifier 34 and bearer data 36. The format 32 of the SMSDPP invoke communication includes a number of other parameters 40 well known to those skilled in the art, but not specifically shown, including an identification of the addressor and addressee short message service entities 12 for the message. The teleservice identifier 34 identifies the teleservice (e.g., cellular messaging, cellular paging) to be used in delivering the message, as well as the type of air interface (e.g., time division multiple access (TDMA), or code division multiple access (CDMA)) 26 used in carrying the message. The bearer data 36 comprises the short message service message itself received from the addressor short message service entity 12), and is pre-formatted specifically to conform to the identified teleservice and air interface type that are believed by the message center 20 to be subsequently used in conveying the message to the addressee short message service entity 12.

With particular reference now to a short message service message addressed for delivery to a mobile station 18 as the addressee short message service entity 12, following generation of the SMSDPP invoke communication, the communication is transmitted from the message center 20 to the mobile switching center 30. At the mobile switching center 30, the addressee information is processed in the home location register 42 and perhaps the visitor location register 44 to determine routing information for the SMSDPP invoke communication to the addressee mobile station 18. Although not shown, the processing to determine the routing information may in fact occur in plural mobile switching centers 30 as the communication is relayed through the network 10 towards the addressee mobile station 18. In accordance with the determined routing information, the SMSDPP invoke communication is transmitted from the message center 20 to the base station 24 believed to be most proximate to the current location of the addressee mobile station 18. The communication is then delivered to the addressee mobile station 18 by means of a broadcast made over the air interface 26.

Delivery of the SMSDPP invoke communication including the short message service message fails if the addressee mobile station 18 is at the time of delivery operating over a type of air interface 26 different than the type of air interface specified in the teleservice identifier 34 of the SMSDPP invoke communication. The reason for this failure is that the bearer data 36 must be in the correct format in order to recover the transmitted short message service message. Typically, the bearer data is formatted to conform to the identified teleservice and air interface type assumed by the message center 20 to be used to convey the SMSDPP invoke communication. If the communication is instead transmitted over another type of air interface 26, the format of the bearer data does not match the air interface used, and the receiving mobile station 18 is unable to recover the transmitted short message service message from the bearer data.

Message delivery failure is particularly a problem in cellular networks 10 supporting the operation of mobile stations 18 with multi-mode capabilities and/or those networks that support the use of plural types of air interfaces 26. For example, a mobile station 18 may be selectively operable in multiple modes over both a TDMA air interface as well as a CDMA air interface. Similarly, the cellular network 10 may include base stations 24 operable in accordance with either or both a TDMA or CDMA communications protocol. At the point in time when the SMSDPP invoke communication is generated at the message center 20, the message center has no actual knowledge of the air interface type currently being used by the network 10 to communicate with the addressee mobile station 18. This information is maintained in the home location register 42 and/or visitor location register 44 of the mobile switching center(s) 30 within the network 10, but it is not communicated to the message center 20. Instead, the message center 20 assumes mobile station operation in accordance with one of the supported air interfaces and formats the bearer data according to that assumption. Upon receipt of the SMSDPP invoke communication, the mobile switching center 30 simply forwards the communication over the air interface 26 currently being used by the addressee mobile station 18 without giving any consideration as to whether the air interface type specified in the teleservice identifier 34 matches the type of air interface actually being used by the mobile station. No manipulation or reformatting of the communication is made by the mobile switching center 30. If the air interface 26 over which the SMSDPP invoke communication is transmitted does not match the air interface type specified in the teleservice identifier parameter 34, short message service message delivery fails because the bearer data cannot be recovered.

There is accordingly a need for an improved method of formatting short message service messages for delivery over those cellular telephone networks supporting the use of plural types of air interfaces. Such an improved formatting method should be capable of facilitating the delivery of the SMSDPP invoke communication independent of the type of air interface actually being used by the addressee mobile station.

SUMMARY OF THE INVENTION

To address the drawbacks found with use of the prior art short message service delivery point-to-point (SMSDPP) invoke communication format in cellular telephone networks supporting plural types of air interfaces, a first embodiment of the present invention utilizes an SMSDPP invoke communication that includes bearer data formatted by the message center for each of the supported air interface types. The included portion of the bearer data in the format matching the air interface actually being used to carry the communication is then processed by the addressee mobile station upon receipt of the communication to recover the transmitted short message service message.

In accordance with an alternative embodiment of the present invention, the bearer data included in the SMSDPP invoke communication is instead formatted by the message center in a generic manner. The generic bearer data is then converted during transmission by the cellular telephone network to air interface type specific bearer data formatted conforming to the specific type of air interface currently being used by the addressee mobile station. The SMSDPP invoke communication, as modified to include the converted bearer data, is then transmitted over the air interface to the addressee mobile station for processing and recovery of the short message service message.

The foregoing embodiments are equally applicable with respect to the origination of a short message service message at a mobile station for transmission to the message center. In accordance with the first embodiment then, a short message service origination communication having bearer data formatted to match the air interface over which the message is transmitted from the mobile station is reformatted to include bearer data formatted for each of the various air interfaces supported by the cellular telephone network. Similarly, in accordance with the second embodiment, the short message service origination communication is reformatted to include bearer data formatted in a generic manner. Following receipt of the origination message at the message center, the message is retransmitted as an SMSDPP invoke communication for delivery to the addressee destination.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 3A is a diagram illustrating a first embodiment of the format used for short message service message transmissions in accordance with the present invention;

FIG. 3B is a diagram illustrating a second embodiment of the format used for short message service message transmissions in accordance with the present invention.

DETAILED DESCRIPTION OF THE DRAWINGS

Figure 1:
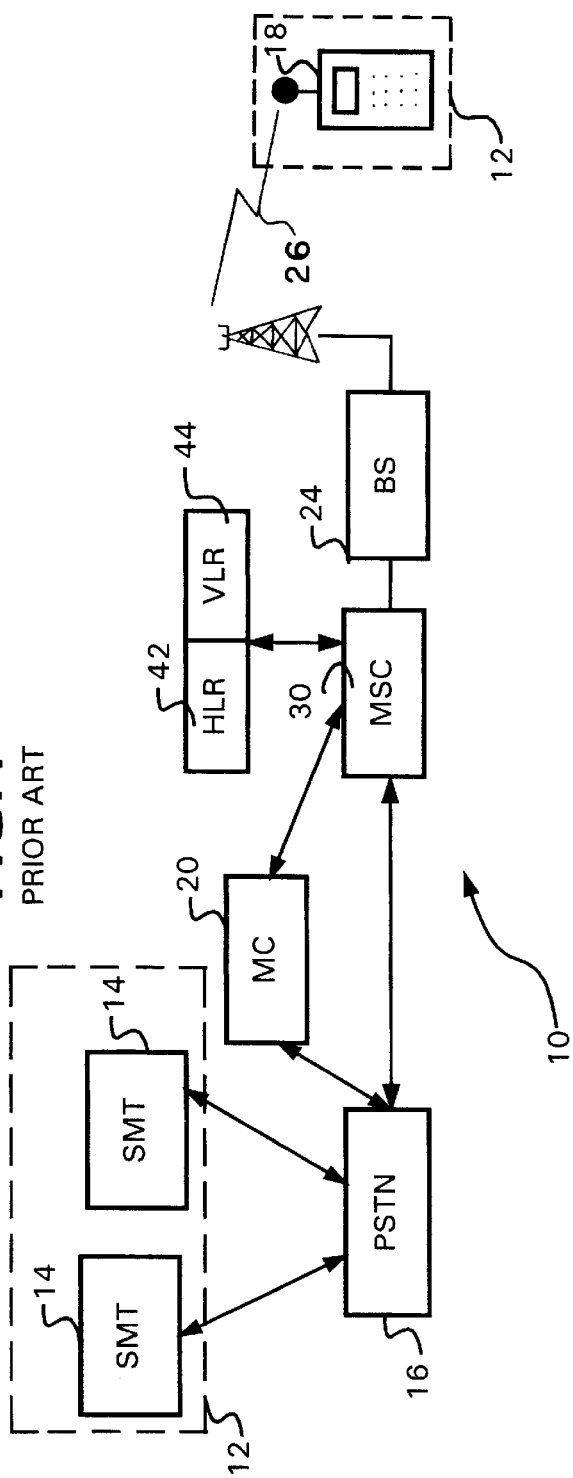
FIG. 1 is a block diagram of a prior art cellular telephone network.
Figure 2:
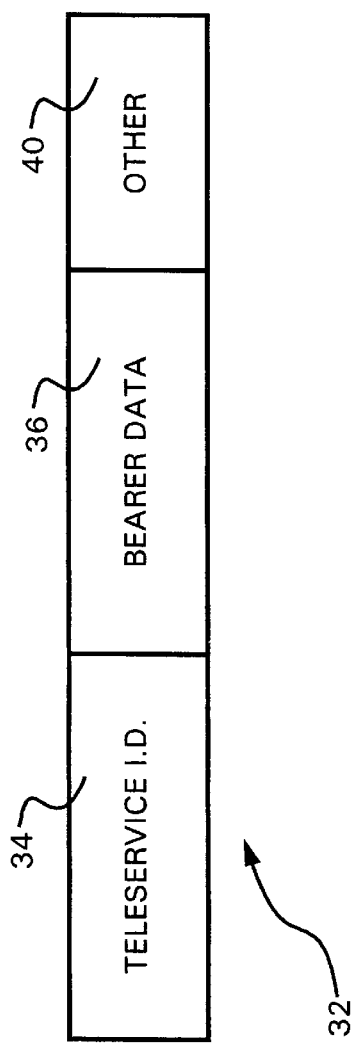
FIG. 2 is a diagram illustrating the prior art format used for short message service message transmissions.

Reference is now made to FIG. 3A wherein there is shown a diagram illustrating a first embodiment of the format 50 used for a short message service delivery point-to-point (SMSDPP) invoke communication in accordance with the present invention. The format 50 for the SMSDPP invoke communication includes bearer data 52 (comprising the short message service message received from the addressor short message service entity) formatted to conform to each of the plural types of air interfaces supported by the cellular telephone network. Thus, if the cellular telephone network supports both a time division multiple access (TDMA) air interface as well as a code division multiple access (CDMA) air interface, the bearer data 52 includes both a TDMA formatted bearer data portion 52(1) and a CDMA formatted bearer data portion 52(2). Portions 52(3) specific to other types of air interfaces may also be included, if needed. The format 50 for the SMSDPP invoke communication further includes a number of other parameters 54 well known to those skilled in the art.

Referring now to FIG. 3B, there is shown a diagram illustrating a second embodiment of the format 60 for a short message service delivery point-to-point (SMSDPP) invoke communication in accordance with the present invention. The format 60 for the SMSDPP invoke communication includes bearer data 62 (comprising the short message service message received from the addressor short message service entity) formatted in a generic fashion to be generally applicable to each of the plural types of air interfaces (i.e., independent of the air interfaces) supported by the cellular telephone network. The generic bearer data 62 in the generated SMSDPP invoke communication is then subsequently converted to air interface specific bearer data by the cellular telephone network prior to completing the transmission of the SMSDPP invoke communication over the air interface to the addressee mobile station. The converted bearer data thus conforms to the type of air interface then actually being used to carry the communication. The format 60 for the SMSDPP invoke communication further includes a number of other parameters 64 well known to those skilled in the art.

Figure 4:
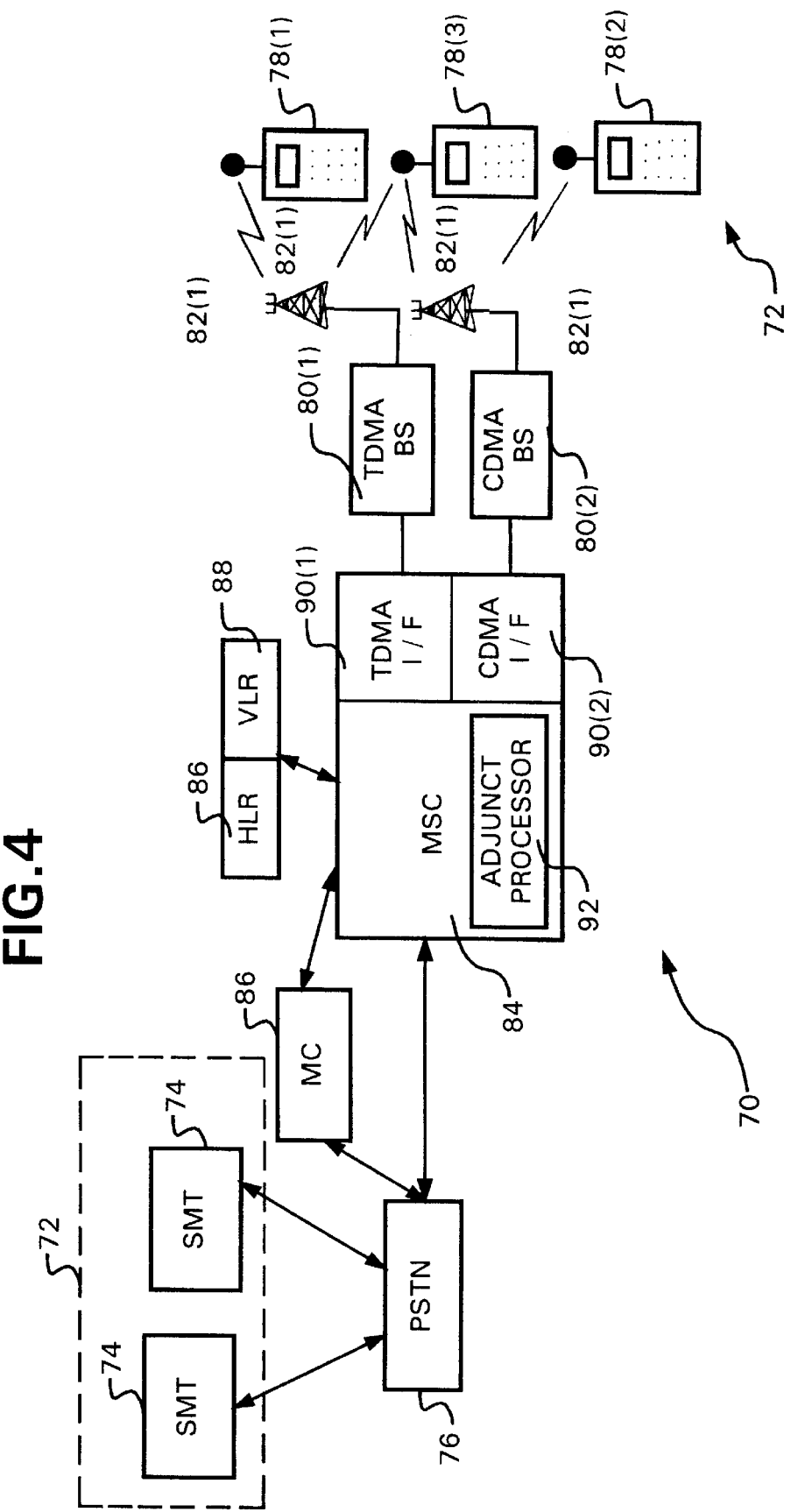
FIG. 4 is a block diagram of a cellular telephone network utilizing the short message service message transmission formats illustrated in FIGS. 3A and 3B.

Reference is now made to FIG. 4 wherein there is shown a block diagram of a digital cellular telephone network 70 supporting a short message service (SMS) for use by subscribers in conjunction with the conventional cellular telephone service. Such networks 70 comprise a time division multiple access (TDMA) type communications network (like that specified by the Global System for Mobile (GSM) communications or the TIA IS-136 Specification) and/or a code division multiple access (CDMA) type communications network (like that specified by the TIA IS-95

Specification) that includes a short message service functionality. Short message servicing provides a means for transferring textual messages between short message entities (SMEs) 72 using the communications environment provided by the cellular telephone network 70. The short message entities 72 participating in the short message service comprise short message terminals (SMT) 74 connected to the fixed telephone network 76 (comprising a public switched telephone network (PSTN) or other equivalent telephone network). The short message entities 72 further comprise subscriber mobile stations (MS) 78 operating within the cellular telephone network 70. Short message service messages must originate with or terminate at one of the subscriber mobile stations 78.

The cellular telephone network 70 includes a plurality of base stations (BS) 80 for effectuating bidirectional radio frequency communications with proximately located mobile stations operating within the network 70. The base stations 80 utilize different types of radio frequency air interfaces 82 in communicating with the mobile stations 80. For example, the base station 80(1) is configured for operation over a first type of air interface 82(1), while the base station 80(2) is configured for operation over a second type of air interface 82(2). The mobile stations 78 operable within the network 70 include first type air interface 82(1) only configured mobile stations 78(1), second type air interface 82(2) only configured mobile stations 78(2), and mobile stations 78(3) configured for operation over plural ones of the air interfaces 82 supported by the network (i.e., multi-mode mobile stations).

While the cellular telephone system 70 is illustrated as having only two base stations 80, it will, of course, be understood that such a system 70 would typically include many more base stations, and that the depiction of only two base stations is to be taken as an illustration of, rather than a limitation on, the operation of the present invention. It will further be understood that cellular telephone systems like the system 70 typically include far more than three mobile stations 78 operating within the system 70 at any one time. The depiction of only three mobile stations 78 then is to be taken as an illustration of, rather than a limitation on, the operation of the present invention. Finally, although only two different types of air interfaces 82 are illustrated as being supported by the network 70, it will be understood that any number of different types of air interfaces may be utilized by the network in connection with the present invention.

Each base station 80 is connected through a mobile switching center (MSC) 84 to the fixed telephone network 76. The mobile switching center 84 operates to control base station 80 operation, maintain a record (in its home location register 86 and visitor location register 88) of mobile station operating parameters and switch, with the fixed telephone network 76, those cellular telephone calls originated by or terminated at the mobile stations 78. The mobile station parameters stored in the mobile switching center 84 include current cell location for each mobile station and an identification of the particular one of the plural network supported air interfaces 82 currently being used by each mobile station. Although only one mobile switching center 84 is shown to simplify the illustration, it will be understood that the network 70 typically will include many mobile switching centers interconnected to each other (perhaps through the fixed telephone network 76), with each mobile switching center being connected to a plurality of base stations 80.

A short message service center or message center (MC) 86 is connected to the fixed telephone network 76 and to the cellular telephone network 70. The connection with the cellular telephone network 70 is made through the mobile switching center 84. The message center 86 receives short message service messages, and functions as a store and forward center for controlling the processing and delivery of the received short message service messages to addressee short message entities 72. In those instances where delivery of a short message service message to a short message service entity 72 fails, the message is stored in the message center 86, to be subsequently retrieved by the addressee short message entity at a later time.

Delivery of a short message service message received from a short message service entity 12 to another short message service entity comprising a mobile station 78 starts with the generation of a short message service delivery point-to-point (SMSDPP) invoke communication by the message center 86. The formats 50 and 60 for the SMSDPP invoke communication used in the network of FIG. 4 are illustrated in FIGS. 3A and 3B, respectively. The first format 50 for the SMSDPP invoke communication includes bearer data 52 comprising a plurality of portions formatted to conform to each of the plural types of air interfaces 82 supported by the cellular telephone network 70. The generated communication is routed by the mobile switching center 84 via the appropriate base station interface (I/F) 90 over the air interface 82 to the addressee mobile station 78. Because the SMSDPP invoke communication includes bearer data 52 portions formatted in accordance with each of the supported air interfaces 82, including that specific air interface actually being used by the addressee mobile station 78, sufficient and proper bearer data is provided to the addressee mobile station to allow for the recovery of the short message service message. The bearer data 52 is accordingly usable in short message service message transmissions independent of the type of air interface actually being used by the addressee mobile station 78.

The second format 60 for the SMSDPP invoke communication, on the other hand, includes generic bearer data 62 with respect to the plural types of air interfaces 82 supported by the cellular telephone network 70. This communication cannot be routed directly to the addressee mobile station 78 because the generic bearer data provides insufficient information to allow for the recovery of the short message service message. Instead, the SMSDPP invoke communication with its generically formatted bearer data 62 is processed in the mobile switching center 84 to convert the generic bearer data to bearer data formatted specifically for use in accordance with the air interface currently being used by the addressee mobile station 78. The processing of the SMSDPP invoke communication to convert the bearer data is performed by a processor within (and/or perhaps an adjunct processor 92) the mobile switching center 84 following retrieval, from the home location register 86 and/or visitor location register 88, of information on the current mobile station air interface being used by the addressee mobile station 78. The generic bearer data 62 is accordingly usable in short message service message transmissions independent of the type of air interface actually being used by the addressee mobile station 78.

The operation of the present invention with respect to the use of the first and second SMSDPP invoke communication formats 50 and 60, respectively, in the delivery of a short message service message may be more completely understood through the examination of some specific examples. Suppose that the network 70 of FIG. 4 includes a TDMA air interface for the first air interface 82(1) and a CDMA air interface for the second air interface 82(2). Further suppose that the first mobile station 78(1) is operable only over the TDMA air interface 82(1), that the second mobile station 78(2) is operable over only the CDMA air interface 82(2), and that the third mobile station 78(3) comprises a dual mode TDMA/CDMA operable mobile station.

Assume now that the short message service provided by the network 70 is configured to use the first SMSDPP invoke communication format 50 of FIG. 3A. Following receipt of a short message service message addressed by the message center 86 for delivery to the first (TDMA) mobile station 78(1), an SMSDPP invoke communication is generated including a bearer data portion 52(1) formatted for the TDMA air interface 82(1) and a bearer data portion 52(2) formatted for the CDMA air interface 82(2). The SMSDPP invoke communication is then transmitted to the mobile switching center 84 where a determination is made from a review of the mobile station air interface information stored in the home location register 86 and/or visitor location register 88 that the addressee mobile station 78(1) operates over the TDMA air interface 82(1). Using the TDMA base station interface 90(1), the SMSDPP invoke communication is then transmitted via the appropriate base station 80 to the addressee mobile station 78(1) over the TDMA air interface 82(1). Mobile station 78(1) recovery of the included short message service message is made by processing the included bearer data portion 52(1) formatted for the TDMA air interface 82(1).

If the message is instead addressed for delivery to the second (CDMA) mobile station 78(2), the same SMSDPP invoke communication is advantageously generated by the message center 86 and transmitted to the mobile switching center 84. From a review of the mobile station air interface information stored in the home location register 86 and/or visitor location register 88, it is determined that the addressee mobile station 78(2) operates over the CDMA air interface 82(2). The communication is then transmitted to the addressee mobile station 78(2) over the CDMA air interface 82(2) using the CDMA base station interface 90(2) and the appropriate base station 80. The short message service message is then recovered by the mobile station 78(2) by processing the included bearer data portion 52(2) formatted for the CDMA air interface 82(2).

If the message is instead addressed for delivery to the third (dual mode) mobile station 78(3), the same SMSDPP invoke communication is again advantageously generated by the message center 86 and transmitted to the mobile switching center 84. At the mobile switching center, a determination is made from a review of the home location register 86 and/or visitor location register 88 as to which air interface 82 is currently being used by the addressee mobile station 78(3). If the mobile station 78(3) is currently using the TDMA air interface 82(1), the SMSDPP invoke communication is routed through the TDMA base station interface 90(1) over the TDMA air interface to the addressee mobile station. The short message service message is then recovered by processing the bearer data portion 52(1) formatted for the TDMA air interface 82(1). If, on the other hand, the mobile station 78(3) is currently using the CDMA air interface 82(2), the SMSDPP invoke communication is routed through the CDMA base station interface 90(2) over the CDMA air interface to the addressee mobile station. The short message service message is then recovered by processing the bearer data portion 52(2) formatted for the CDMA air interface 82(2).

Next assume that the short message service provided by the network 70 is configured to use the second SMSDPP invoke communication format 60 as illustrated in FIG. 3B. Following receipt of a short message service message addressed by the message center 86 for delivery to the first (TDMA) mobile station 78(1), an SMSDPP invoke communication is generated including the generic bearer data 62. The SMSDPP invoke communication is then transmitted to the mobile switching center 84 where a determination is made from a review of the home location register 86 and/or visitor location register 88 that the addressee mobile station 78(1) operates over the TDMA air interface 82(1). Although the generic bearer data 62 does not include enough information to allow for the recovery of the short message service message, there is enough information present for the MSC processor (perhaps the adjunct processor 92) to convert the generic bearer data to air interface specific bearer data. In this particular case, the conversion is to TDMA air interface specific bearer data. Using the TDMA base station interface 90(1), the SMSDPP invoke communication with the converted bearer data is transmitted to the addressee mobile station 78(1) over the TDMA air interface 82(1) via the appropriate base station 80. Mobile station 78(1) recovery of the included short message service message is made by processing the converted bearer data formatted for the TDMA air interface 82(1).

If the message is instead addressed for delivery to the second (CDMA) mobile station 78(2), the same SMSDPP invoke communication having generic bearer data is advantageously generated by the message center 86 and transmitted to the mobile switching center 84. Following the determination made from a review of the home location register 86 and/or visitor location register 88 that the addressee mobile station 78(2) operates over the CDMA air interface 82(2), the MSC processor (adjunct processor 92) converts the generic bearer data to CDMA air interface specific bearer data. The communication is then transmitted to the addressee mobile station 78(2) over the CDMA air interface 82(2) using the CDMA base station interface 90(2). The short message service message is then recovered by the mobile station 78(2) by processing the converted bearer data.

If the message is instead addressed for delivery to the third (dual mode) mobile station 78(3), the same SMSDPP invoke communication having generic bearer data is again advantageously generated by the message center 86 and transmitted to the mobile switching center 84. At the mobile switching center, a determination is made from a review of the home location register 86 and/or visitor location register 88 as to which air interface 82 is currently being used by the addressee mobile station 78(3). If the mobile station 78(3) is determined to be using the TDMA air interface 82(1), the MSC processor (adjunct processor 92) converts the generic bearer data to TDMA air interface specific bearer data. The SMSDPP invoke communication is then routed through the TDMA base station interface 90(1) over the TDMA air interface to the addressee mobile station where the converted bearer data is used to recover the short message service message. If, on the other hand, the mobile station 78(3) is determined to be using the CDMA air interface 82(2), the MSC processor (adjunct processor 92) converts the generic bearer data to CDMA air interface specific bearer data. The SMSDPP invoke communication is then routed through the CDMA base station interface 90(2) over the CDMA air interface to the addressee mobile station where the converted bearer data is used to recover the short message service message.

It is recognized that it is likely that multiple service operators will be authorized to provide cellular communications services in any one given geographic area. These service providers may choose to utilize only one of a plural number of available air interfaces 82 which would support the use of short message service messaging. Often times the air interfaces chosen by the providers will be different. For example, one service provider may choose to use a TDMA protocol for its digital cellular communications, while another service provider may instead elect to use a CDMA protocol. For the subscriber, the fact that different digital protocols are used in the service area is of no concern until subscribers with different cellular providers desire to exchange short message service message communications. In such a case the originated short message service message (formatted specifically for the originating air interface) may be undeliverable in the destination providers cellular network absent the presence in the destination cellular network of the processing capabilities described previously.

Thus, in accordance with yet another embodiment of the present invention, the originating short message service message, which is formatted in an air interface specific manner, is processed following transmission from a mobile station over the air interface to allow for delivery as an SMSDPP invoke communication in any destination cellular network. Thus, if the destination cellular network does not include the functionality of processing capabilities described herein, that will not inhibit inter-network short message service messaging. To accomplish this goal, the originating short message service message is reformatted by the processor (perhaps comprising the adjunct processor 92) of the mobile switching center 84 in the originating cellular network. This reformatting may take the form of generating bearer data 52 formatted (see, FIG. 3A) to conform to each of the types of air interfaces 82 commonly supported by the cellular telephone networks of different service providers. Accordingly, when the message is received by the message center 86 and retransmitted as an SMSDPP invoke communication for delivery to the addressee mobile station in the destination cellular network, the short message service message comprising the bearer data 52 is formatted in accordance with that network's air interface and is accordingly deliverable to and recoverable by the addressee mobile station. There is no need for the destination cellular network to include additional functionality to handle the message and format it properly for delivery.

Alternatively, the reformatting may take the form of generating bearer data 52 formatted in a generic manner with respect to each of the types of air interfaces 82 commonly supported by cellular telephone networks (see, FIG. 3B). Accordingly, when the message is received by the message center 86 and retransmitted as an SMSDPP invoke communication for delivery to the addressee mobile station, the short message service message comprising the bearer data 52 is formatted in a manner that will allow a processor (perhaps comprising the adjunct processor 92) of the mobile switching center 84 in the destination cellular network to convert the generic bearer data to air interface specific bearer data prior to completion of the transmission to the addressee mobile station. This particular alternative would require the presence of short message service format processing capabilities in the destination cellular network.

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a cellular telephone network supporting short message service (SMS) message deliver over a plurality of different types of air interfaces, a method for handling short message service message delivery to an addressee mobile station comprising the steps of:

generating a short message service message including a plurality of bearer data portions, each included bearer data portion correspondingly formatted for a different one of the plurality of different types of air interfaces available in the cellular telephone network; and transmitting the generated short message service message over the cellular telephone network to the addressee mobile station.

2. The method as in claim 1 wherein the step of transmitting comprises the steps of:

identifying a certain one of the plurality of different types of air interfaces as currently being used for cellular communication by the addressee mobile station; and transmitting the short message service message to the addressee mobile station over the identified certain one of the plurality to different types of air interfaces.

3. The method as in claim 2 further including the step of recovering from the short message service message the bearer data portion corresponding to the identified certain one of the plurality of different types of air interfaces over which the short message service was transmitted and the addressee mobile station is currently operating.

4. The method as in claim 1 wherein the plurality of different types of air interfaces include a time division multiple access (TDMA) air interface and a code division multiple access (CDMA) air interface and the bearer data portions of the short message service message comprise TDMA formatted bearer data and CDMA formatted bearer data, respectively.

5. In a cellular telephone network supporting short message service, a method for handling short message service message delivery to an addressee mobile station comprising the steps of:

generating a short message service delivery communication including bearer data formatted in a generic fashion;

transmitting the generated short message service delivery communication with generic bearer data over a first portion of the cellular telephone network;

converting the generic bearer data of the transmitted short message service delivery communication to air interface specific bearer data formatted for a certain air interface currently being used by the addressee mobile station; and transmitting the short message service delivery communication with air interface specific bearer data over a second portion of the cellular telephone network to the addressee mobile station, the second portion including the certain air interface currently being used by the addressee mobile station.

6. The method as in claim 5 wherein the step of converting comprises the steps of:

identifying a certain one of a plurality of different types of available air interfaces as currently being used for cellular communication by the addressee mobile station; and changing the generic bearer data format to a format compatible with the identified certain one of the plurality of different types of air interfaces.

7. The method as in claim 6 wherein the plurality of different types of air interfaces include a time division multiple access (TDMA) air interface and a code division multiple access (CDMA) air interface and the air interface specific bearer data of the short message service delivery communication comprises TDMA formatted bearer data and CDMA formatted bearer data, respectively.

8. The method as in claim 5 further including the step of addressee mobile station recovering of the short message service message from the transmitted short message service delivery communication by using the converted bearer data specific to the certain air interface over which the short message service delivery communication was transmitted.

9. A cellular telephone system, comprising:
a first base station for effectuating radio frequency communications with mobile stations over a first air interface;
a second base station for effectuating radio frequency communications with mobile stations over a second air interface;
a mobile switching center connected to the first and second base stations; and
a message center connected to the mobile switching center for storing and forwarding short message service (SMS) messages to mobile stations, each short message service message comprising a plurality of bearer data portions generated by the message center and sent to an addressee mobile station via the mobile switching center and either the first or second base station, the plurality of bearer data portions of the short message service message including both a first bearer data portion formatted in accordance with the first air interface and a second bearer data portion formatted in accordance with the second air interface.

10. The system of claim 9 wherein the mobile switching center includes means for identifying on which of the first or second air interfaces the addressee mobile station is currently operating, the short message service message being routed through the base station corresponding to the identified one of the first or second air interfaces.

11. The system as in claim 9 wherein the addressee mobile station is operable over only the first air interface and functions to recover bearer data from said short message service message when routed through the first base station using the included first bearer data portion.

12. The system as in claim 9 wherein the addressee mobile station is operable over only the second air interface and functions to recover bearer data from said short message service message when routed through the second base station using the included second bearer data portion.

13. The system as in claim 9 wherein the addressee mobile station is operable over both the first and second air interfaces and functions to recover the bearer data from said short message service message when routed through the first base station using the included first bearer data portion or when routed through the second base station using the included second bearer data portion.

14. The system of claim 9 wherein the first air interface comprises a time division multiple access (TDMA) air interface and the first bearer data portion comprises TDMA formatted bearer data, and wherein the second air interface comprises a code division multiple access (CDMA) air interface and the second bearer data portion comprises CDMA formatted bearer data.

15. A cellular telephone system, comprising:
a first base station for effectuating radio frequency communications with mobile stations over a first air interface;
a second base station for effectuating radio frequency communications with mobile stations over a second air interface;
a message center for storing and forwarding short message service messages to mobile stations, the short message service messages transmitted by a short message service delivery communication generated by the message center and sent in the direction of an addressee mobile station, the short message service delivery communication including bearer data formatted in a generic fashion; and
means connected between the message center and the first and second base stations for converting the generic bearer data of the transmitted short message service delivery communication to first air interface specific bearer data if the addressee mobile station is currently operating on the first air interface and routing the communication to the addressee mobile station through the first base station and over the first air interface, and for converting the generic bearer data of the transmitted short message service delivery communication to second air interface specific bearer data if the addressee mobile station is currently operating on the second air interface and routing the communication to the addressee mobile station through the second base station and over the second air interface.

16. The system of claim 15 wherein the means for converting includes means for identifying on which of the first or second air interfaces the addressee mobile station is currently operating.

17. The system as in claim 15 wherein the addressee mobile station is operable over only the first air interface and functions to recover the short message service message from the short message service delivery communication when routed through the first base station using the first air interface specific bearer data converted from the generic bearer data.

18. The system as in claim 15 wherein the addressee mobile station is operable over only the second air interface and functions to recover the short message service message from the short message service delivery communication when routed through the second base station using the second air interface specific bearer data converted from the generic bearer data.

19. The system as in claim 15 wherein the addressee mobile station is operable over both the first and second air interfaces and functions to recover the short message service message from the short message service delivery communication when routed through the first base station using the first air interface specific bearer data converted from the generic bearer data or when routed through the second base station using the second air interface specific bearer data converted from the generic bearer data.

20. The system of claim 15 wherein the first air interface comprises a time division multiple access (TDMA) air interface and the first air interface specific bearer data comprises TDMA formatted bearer data, and wherein the second air interface comprises a code division multiple access (CDMA) air interface and the second air interface specific bearer data comprises CDMA formatted bearer data.

21. In a cellular telephone network supporting short message service transmission over a plurality of different types of air interfaces, a method for handling short message service (SMS) messages sent from an addressor mobile station comprising the steps of:
generating a short message service message including bearer data formatted only for one specific air interface;

transmitting the generated short message service message from the addressor mobile station over the specific air interface; and converting the transmitted short message service message to a converted short message service message that includes a plurality of bearer data portions, each bearer data portion correspondingly formatted for a different one of a plurality of different types of air interfaces available in the cellular telephone network.

22. The method as in claim 21 further including the steps of:

identifying a certain one of the plurality of different types of air interfaces as currently being used for cellular communication by an addressee mobile station; and transmitting the inverted short message service message to the addressee mobile station over the identified certain one of the plurality of different types of air interfaces.

23. The method as in claim 22 further including the step of recovering from the converted short message service message the bearer data portion corresponding to the identified certain one of the plurality of different types of air interfaces over which the short message service message was transmitted and the addressee mobile station is currently operating.

24. The method as in claim 21 wherein the plurality of different types of air interfaces include a time division multiple access (TDMA) air interface and a code division multiple access (CDMA) air interface and the bearer data portions of the converted short message service message comprise TDMA formatted bearer data and CDMA formatted bearer data, respectively.

25. In a cellular telephone network supporting short message service, a method for handling short message service (SMS) messages originated at an addressor mobile station comprising the steps of:

generating a short message service message including bearer data formatted for only one specific air interface;

transmitting the generated short message service message over the specific air interface; and converting the air interface specific bearer data of the transmitted short message service message to bearer data formatted in a fashion that is generic as to a plurality of different types of air interfaces.

26. The method of claim 25 further including the steps of:

converting the generic bearer data to air interface specific bearer data formatted for a certain air interface currently being used by an addressee mobile station; and transmitting the short message service message with air interface specific bearer data over the certain air interface currently being used by the addressee mobile station.

27. The method as in claim 26 wherein the step of converting the generic bearer data comprises the steps of:

identifying a certain one of a plurality of different types of available air interfaces as currently being used for cellular communication by the addressee mobile station; and changing the generic bearer data format to a format compatible with the identified certain one of the plurality of different types of air interfaces.

28. The method as in claim 27 wherein the plurality of different types of air interfaces include a time division multiple access (TDMA) air interface and a code division multiple access (CDMA) air interface and the air interface specific bearer data of the short message service message comprises TDMA formatted bearer data and CDMA formatted bearer data, respectively.

29. The method as in claim 27 further including the step of recovering bearer data from the short message service message by using the converted bearer data specific to the certain air interface over which the short message service message was transmitted.

30. A cellular telephone system, comprising:

a first base station for effectuating radio frequency communications with mobile stations over a first air interface;

a second base station for effectuating radio frequency communications with mobile stations over a second air interface;

a mobile switching center connected to the first and second base stations;

a message center connected to the mobile switching center for storing and forwarding short message service (SMS) messages; and means for processing each short message service message transmitted from mobile stations with air interface specific bearer data for conversion to a plural bearer data portion short message service message including both a first bearer data portion formatted in accordance with the first air interface and a second bearer data portion formatted in accordance with the second air interface.

31. The system of claim 30 wherein the first air interface comprises a time division multiple access (TDMA) air interface and the first bearer data portion comprises TDMA formatted bearer data, and wherein the second air interface comprises a code division multiple access (CDMA) air interface and the second bearer data portion comprises CDMA formatted bearer data.

32. A cellular telephone system, comprising:

a first base station for effectuating radio frequency communications with mobile stations over a first air interface;

a second base station for effectuating radio frequency communications with mobile stations over a second air interface;

a message center for storing and forwarding short message service messages; and means for processing short message service messages transmitted from mobile stations with air interface specific bearer data to a short message service communication including bearer data formatted in a generic fashion for subsequent conversion prior to delivery to an addressee mobile station to first air interface specific bearer data if the addressee mobile station is currently operating on the first air interface or conversion to second air interface specific bearer data if the addressee mobile station is currently operating on the second air interface.

33. A system of claim 32 wherein the first air interface comprises a time division multiple access (TDMA) air interface and the first air interface specific bearer data comprises TDMA formatted bearer data, and wherein the second air interface comprises a code division multiple access (CDMA) air interface and the second air interface specific bearer data comprises CDMA formatted bearer data.

* * * * *

UNITED STATES PATENT AND TRADEMARK OFFICE
CERTIFICATE OF CORRECTION

PATENT NO. : 5,920,822
DATED : July 6, 1999
INVENTOR(S) : Houde et al.

It is certified that error appears in the above-indentified patent and that said Letters Patent is hereby corrected as shown below:

| | |
|---|---|
| Column 10, line 3 | Please replace "deliver" with --delivery--. |
| Column 10, line 23 | Please replace "to" with --of--. |
| Column 10, line 28 | Please insert --message-- after "service". |
| Column 13, line 15 | Please replace "inverted" with --converted--. |
| Column 14, line 58 | Please replace "A" with --The--. |

Signed and Sealed this

Fifteenth Day of May, 2001

Attest:

NICHOLAS P. GODICI

*Attesting Officer*   *Acting Director of the United States Patent and Trademark Office*